INVENTOR
CHARLES C. CRAM.
BY
James D. Givnan
ATTORNEY

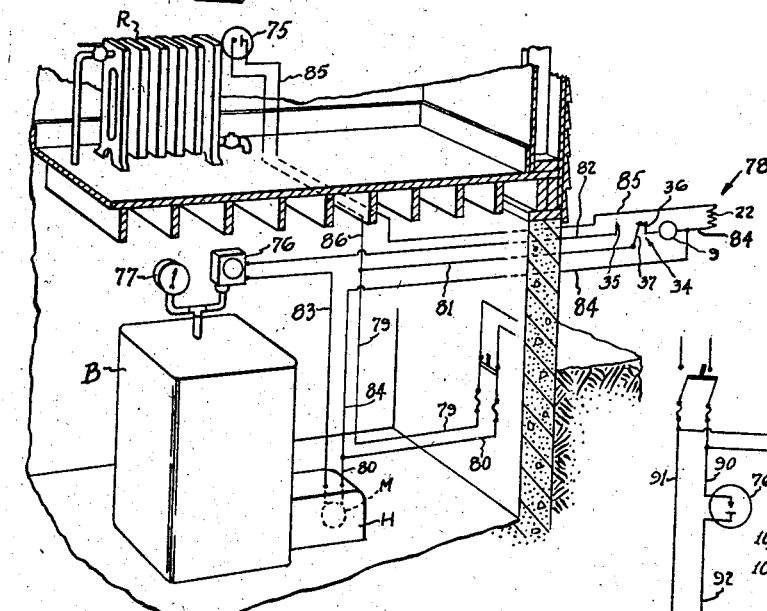

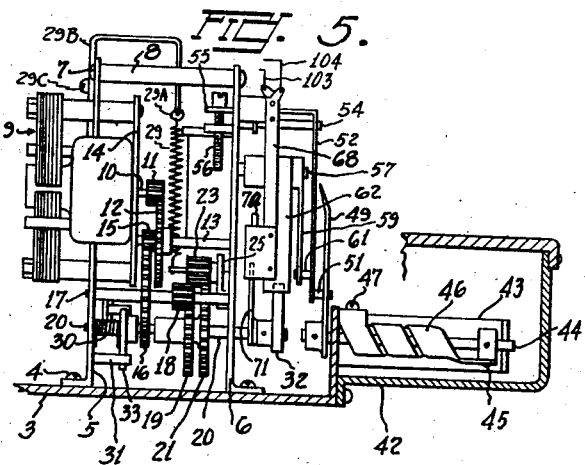
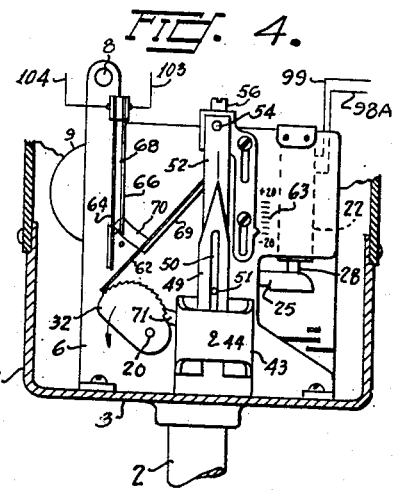
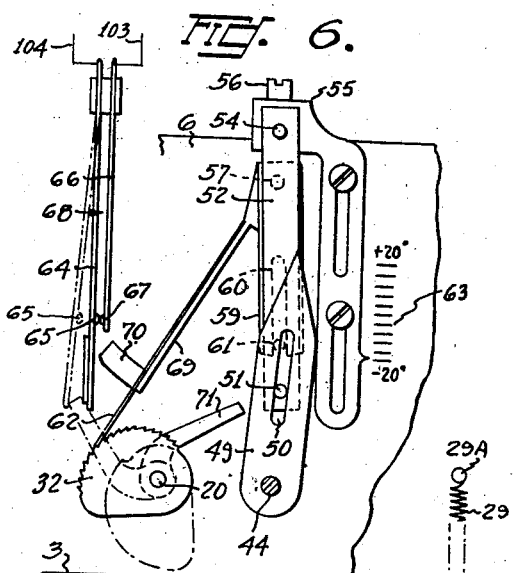
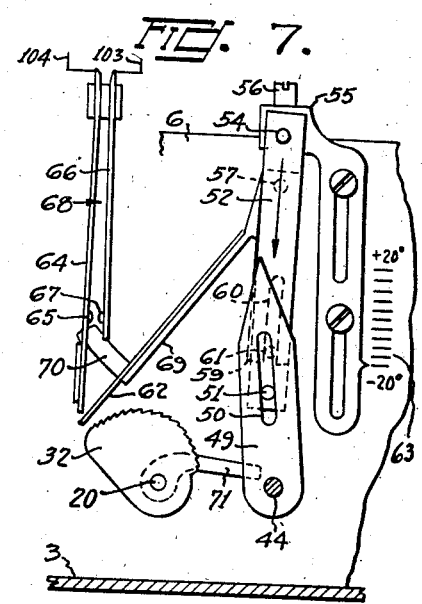
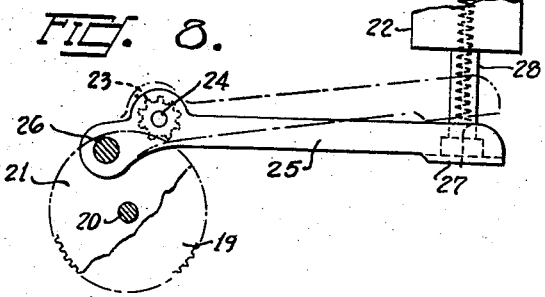
INVENTOR
CHARLES C. CRAM
BY
James D. Givnan
ATTORNEY June 24, 1941.  C. C. CRAM  2,246,668
TEMPERATURE CONTROL SYSTEM
Filed Aug. 9, 1938  3 Sheets-Sheet 3

Patented June 24, 1941

2,246,668

UNITED STATES PATENT OFFICE 2,246,668

TEMPERATURE CONTROL SYSTEM

Charles C. Cram, Portland, Oreg., assignor to L. R. Teeple Company, Portland, Oreg.

Application August 9, 1938, Serial No. 223,869

9 Claims. (Cl. 236—91)

This invention relates to improvements in temperature control systems and more particularly to apparatus for impulse heating control.

The principal object of my invention is the provision of a control system which will so operate the heating system that heat loss will be balanced and a desired temperature maintained within the building.

A second object is to provide a system whereby heating will be accomplished in time spaced impulses terminated by change of a condition within the system.

A further object is the provision in such a system of means for varying the time spacing in accordance with variations in outdoor temperature.

Still a further object of the invention is the provision in a timer suited to the accomplishment of the above objects of adjusting means whereby the range of temperature compensation for the timer may be varied without affecting the time interval at predetermined temperature.

Method

My method consists broadly in operating the heat supplying means until the heating system at a desired point reaches a desired condition, which period can be called a heating impulse, and then interposing a timed delay of variable duration depending on outdoor temperature before the next operation is started. During mild weather the timed delay will reach its maximum of say one or two hours after which the heat supplying means will be started and allowed to run until the heating impulse is complete. As the weather grows progressively cooler, the timed delay period will be shortened until, at an outdoor temperature which requires continuous operation of the heating plant to maintain suitable indoor temperature, this delay will be entirely omitted and heat will flow continuously. By thus spacing the heating impulses in accordance with outdoor temperature, the building can be adequately supplied with heat, while at the same time saving a large percentage of fuel as compared with maintaining steam or hot water in the system throughout the day.

The time required to deliver heat to the system depends on many variable factors, such as characteristics of the heat supplying means and heat distributing system and the frequency of operation. No predetermined allowance can be made for this time which would be applicable to all systems, and I have, therefore, utilized the effect of heating operation, namely, increase in boiler temperature or pressure or in the pressure or temperature of a remote portion of the system, to gauge the completion of a heating impulse, thus automatically embracing all variable factors and compensating for them in my operating program.

For more effective control I propose to use the temperature of a distant radiator as the condition determining the completion of the operation, because this factor is a definite indication that heat has not only been supplied to the system but has circulated to the ends of that system and not been robbed by nearby radiators. Should installation costs prevent installing a regulator at such a location, an indirect indication that heat is being supplied the system may be obtained from a regulator installed directly on the boiler or main.

The equipment herein described with which I accomplish my purpose consists of a resettable timer of variable time interval as determined by outdoor temperature and a commercial pressure or temperature responsive regulator which I shall call an impulse regulator, since its function is to determine the completion of a heating impulse and control the timer reset mechanism accordingly. This equipment is well suited to control coal, oil or gas burners or may be applied to district steam valves or used in multiple to regulate the various zones of a building in which control is subdivided. For purposes of illustration the control equipment is described and illustrated herein as applied to a single zone system heated by a burner fired boiler.

The foregoing and other objects will appear as my invention is more fully hereinafter described in the following specification, illustrated in the accompanying drawings, and finally pointed out in the appended claims.

In the drawings:

Figure 1 is an installation diagram, in perspective, showing a simplified system operating on line voltage throughout.

Figure 2 is the schematic wiring diagram of Figure 3.

Figure 3 is another installation diagram, in perspective, of a more elaborate arrangement using reduced voltage in selected portions of the system and including accessories.

Figure 4 is a front elevation of the outdoor timing device with casing broken away and showing the temperature responsive parts in 65° F., position, or, in other words, at the position of maximum interval and with the timer just reset.

Figure 5 is a side elevation of Figure 4.

Figure 6 is an enlarged fragmentary view of the temperature responsive parts positioned at, say, 40° F. whereby the time interval is shortened.

Figure 7 is a view similar to Figure 6 but showing the position of thermal element and related parts when outside temperature reaches 67° F. or above, thus opening the timer control switch and suspending further heating operation.

Figure 8 is a fragmentary view partly in section illustrating the operation of a solenoid-actuated time clutch.

Figure 9:
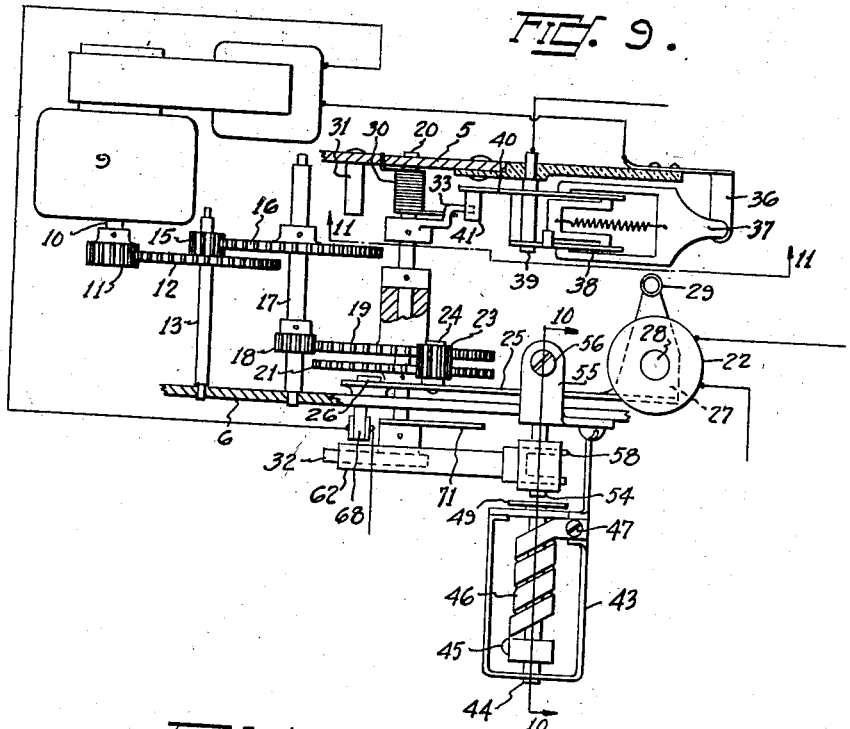
Figure 9 is a somewhat exaggerated view of the instrument in which the gearing has been shown extended to one side for clearness of illustration.
Figure 10:
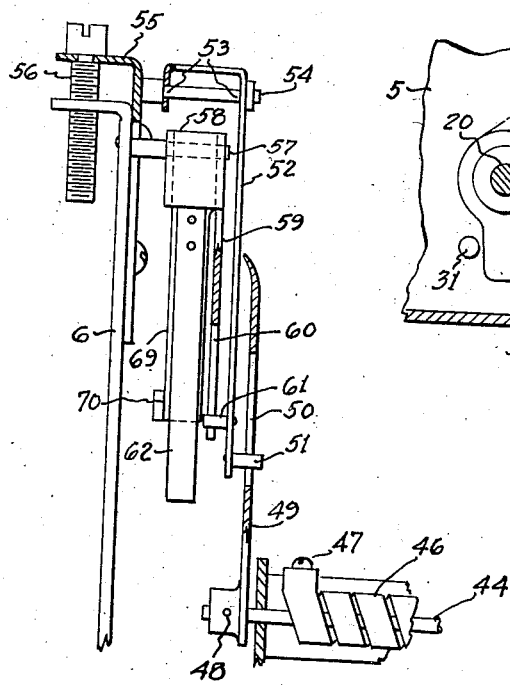
Figure 10 is a vertical sectional view taken along the line 10—10 of Figure 9.

Referring now more particularly to the drawings:

The outdoor timer instrument comprises, within a main housing 1 provided with suitable support 2, housing base 3 (see Figure 5) to which are secured by bolts 4, two vertical walls 5 and 6 which are secured at their upper ends by bolts 7 passing through tubular spacer elements 8. A time motor (see Figure 9), generally indicated at 9, is bolted to the wall in any approved manner and its shaft 10 extends inwardly through the wall and terminates in a driving gear 11. The time motor, by means of the gear 11, operates a time gear-train which comprises a gear 12 secured to a shaft 13 journaled at one end in the wall 6 and at its opposite end in the sub plate 14 of the time motor, as shown. Secured to the gear 12 or made integral therewith, is a gear 15 which meshes at all times with a gear 16 which is secured to a shaft 17 rotatably mounted in the walls 5 and 6. Also secured to the shaft 17 and spaced apart from the gear 16 is a gear 18 which meshes with and drives an idling gear 19 rotatably mounted on a shaft 20 which is journaled, as shown, in the walls 5 and 6. Adjacent the idling gear 19 is a gear 21 secured to the shaft 20 and adapted to rotate the same through a clutch mechanism adapted to impart rotation of the idling gear 19 to the gear 21. The clutching mechanism (see Figure 8) is actuated by the reset solenoid 22 and consists of an idler gear 23 carried by a pin 24 secured to a lever 25 whose one end is pivotally mounted, as at 26, to the wall 6. The opposite end of the lever 25 terminates in a platform or lateral portion 27 disposed in the path of movement of the core 28 of the reset solenoid 22. This same end of the lever is connected with one end of a spring 29 whose opposite end is secured at 29A to a bracket 29B which is adjustably mounted as at 29C to the wall 5. The function of the spring is to lift the lever 25 into its dotted line position when the core has been lifted upon energization of the solenoid 22. With the lever in its full line position the idling gear 23 intermeshes with the gears 19 and 21 and imparts rotary motion of the gear 19 to the gear 21 which in turn rotates the shaft 20 against the urge of torsion spring 30. Upon energization of the solenoid 22 and the resultant upward movement of the lever 25 and the disengagement of the gear 23 from the gears 19 and 21, the gear 21, its shaft 20 and related parts are reset by the torsion spring 30 against a stop pin 31 secured to wall 5 or to a position determined by a reset cam 32 and related parts as will later be described, while the gear 19 continues to rotate so long as the other gears of the time gear train are in motion.

Figure 11:
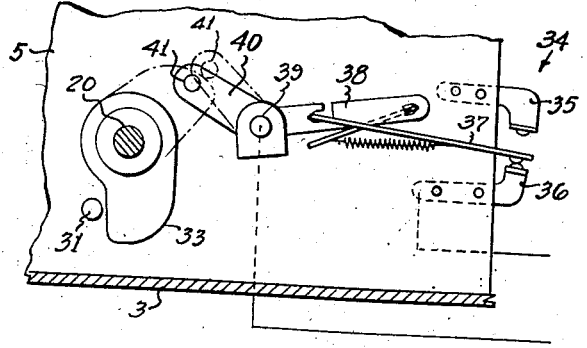
Figure 11 is a sectional elevation along the line 11—11 of Figure 9.

Secured to one end of the shaft 20 is the resetting cam 32 with a portion stepped spirally for selective engagement with a stop to be described later. Secured to the shaft 20 near its other end is a switch-actuating cam 33 (see Figure 11) adapted to open and close the burner switch 34 of the snap-acting self-resetting type which includes fixed main contact 35 and back contact 36. A movable contact blade 37 operates between the two contacts and closes a circuit (in Figure 2) through 35 to energize the burner motor M or through 36 to energize the time motor 9. In Figure 3 the blade 37 closes a circuit only through contact 35 to the burner motor. The contact blade 37 is carried by an actuating arm 38 which is pivoted as at 39 to the wall 5 of the instrument. The arm 38 is formed with a projection 40 which carries a pin 41 arranged in the path of movement of the cam 33 so that as the cam moves upwardly into its dotted line position and moves the projection 40 upwardly, the switch blade 37 will move away from contact 36 and into contact with 35. It will be noted that the resetting cam 32 and the cam 33 being secured to the same shaft 20 rotate together.

Secured to and extending outwardly from the wall 6, into a subcasing 42, is a frame 43 for rotatably supporting one end of a shaft 44 to which is secured as at 45 one end of a temperature-sensitive element 46 of the spiral type. The other end of the element 46 is secured, as at 47, to the frame 43 so that rotation of the temperature-sensitive element in either direction will impart corresponding rotary motion to the shaft 44 to which is secured as at 48 an arm 49 which is slotted longitudinally as at 50. A pin 51 carried by an arm 52 is slidably embraced within the slot 50 and as the arm 49 moves to the right or the left under temperature fluctuations the arm 52 will be likewise moved. The arm 52 is pivoted, as at 53 to a shaft 54 which is carried by a vertically adjustable bracket 55 which is adjustably mounted to the top edge of the wall 6 by means of an adjusting bolt 56. By this arrangement the arm 52 may be raised or lowered with respect to the arm 49 so that a greater or lesser movement may be imparted to the arm 52 by any given movement of arm 49 according to the location of the pin 51 within the slot 50.

Immediately below the shaft 54 is another shaft 57 to which is swingably mounted a bracket 58 from which depends an arm 59 bifurcated as at 60 to slidably embrace a pin 61 also carried by the lower end of the arm 52, from which it will be seen that any movement of the arm 52 will be imparted to the arm 59 which in turn will rock the bracket 58 around its pivot point 57. To the bracket 58 is secured a flexible steel blade 62 whose lower end is adapted for periodic contact with the resetting cam 32 during predetermined low outdoor temperatures to establish variable starting points of operation of the resetting cam and, therefore, of switch tripping cam 33.

The point of contact is determined by the position of the blade 62 which is motivated through the adjustable lever system by the temperature-sensitive element 46. At a temperature of 65° F. the arm 49, the arm 52, and the arm 59 are in alignment with each other. A movement of the arm 49 to the right indicates a decrease in temperature below 65° F. and a movement to the left indicates a rise in temperature above 65° F. As indicated in Figure 6, a drop in temperature below 65° F. with a resultant movement of the arm 49 to the right, will cause the blade 62 to be positioned to serve as a stop for the resetting cam 32. As shown in Figure 7, a rise in temperature above 65° F. will swing the lower end of the blade 62 out of the range of contact with the resetting cam.

It will readily be seen that as temperature becomes progressively lower than 65° F. the blade 62 will tend to move downward and upon each resetting will engage a tooth of resetting cam 32 of shorter radius from shaft 20 and consequently progressively restrict the return movement of switch actuating cam 33. When blade 62 engages the tooth of least radius the return movement upon reset operation will be so slight that burner control switch 34 will not be free to reset and the burner will in consequence operate continuously under control only of the boiler limit regulator. The temperature at which blade 62 attains this position is a critical value known generally as the design temperature, being the temperature at which the heating plant must operate continuously to satisfactorily heat the building. The adjusting bolt 56 is provided to adjust the instrument for the continuous operation temperature required by the particular locality and for the heating plant which the outdoor timer is to control. By varying the lever relationships of arm 52 to arm 49 by means of the bolt 56 the temperature difference required to move blade 62 from the top step to the lowest or continuous operation step of cam 32 may be varied to suit local requirements without affecting the value of the top step temperature of 65° F., since at this value the levers are always in alignment regardless of adjustment. In other words, though the outdoor timer will always commence to function, and at its maximum time interval, at 65° F., the temperature required to eliminate the time delay entirely may be varied from approximately plus 20° F. to minus 20° F. by means of adjusting bolt 56, the continuous operation temperature being shown on scale 63.

In the form of the invention illustrated in Figure 3 which employs reduced voltage for the operation of solenoid and time motor the mechanism is as above described, with the addition of several other features hereinafter to be described.

Suitably attached to and insulated from wall 6 (see Figure 6) and from each other are provided extended switch blade 64 bearing contact 65, and switch blade 66 bearing contact 67, these parts being generally designated as switch 68. Contact 65 is biased normally into contact with contact 67 by the spring of blade 64. Beneath the blade 62 is an arm 69 formed integral with bracket 58 and the lower end of this arm is formed with a perpendicular projection 70 in plane with and arranged to contact the extended end of contact blade 64 at a temperature of approximately 65° F. and upon a slight increase above this temperature to move blade 64 and thus separate contacts 65 and 67 of switch 68 stopping time motor 9.

Secured to shaft 20 is an arm 71 angularly disposed with respect to cam 32 and in plane with extended blade 64 though not with projection 70. Upon rotation of shaft 20 and immediately after cam 33 has tripped burner switch 34 the arm 71 engages blade 64 and opens switch 68 to stop time motor 9 and prevent possible damage due to excessive over travel of shaft 20 and associated parts during burner operations, as will hereinafter be described.

Accessory to the second embodiment of my invention (see Figure 3) is an electric heating element 72 and a heater control thermostat 73 both disposed within the main casing 1 of the device but thermally insulated from the subcasing 42 containing element 46. The heater is provided to prevent binding or failure of any of the parts due to excessively cold temperature and is energized through thermostat 73 whenever the temperature of main casing 1 falls below a predetermined minimum or the thermostat may be omitted and the heater energized directly and continuously. For purpose of clearness these parts, which are entirely conventional, have been omitted from drawings of the mechanism but are shown in wiring diagrams Figure 2 and Figure 3.

Turning now to Figure 1 which is a diagrammatic installation view of the first or simplified form of my invention, with the outdoor timer shown schematically: R indicates a radiator disposed in a room or space to be heated. The radiator is supplied with steam from the boiler B of a hot water or steam heating system which is fired by a motor-actuated heating unit H—the motor being indicated at M. In this installation only the essential elements of the invention are employed. The system is simplified for line voltage throughout and certain of the accessories shown in the low voltage hook-up of Figure 3 are eliminated.

In intimate contact with the radiator R, and adapted to partake of its temperature, is an impulse regulator 75. Associated with the boiler B and actuated by the pressure or temperature thereof is a boiler limit-regulator 76 and a conventional gauge 77. Mounted in any convenient location on the exterior of the building, and adapted to respond to fluctuation in the temperature of the outside atmosphere, is my outside timer, generally indicated at 78. This instrument, previously described in detail, includes the burner motor switch 34, actuated by the time motor 9, the actuator being resettable upon energization of solenoid 22.

The system is supplied from the domestic service through wires 79 and 80. Wire 79 connects through a branch wire 81 with the center blade 37 of burner control switch 34, the main stationary contact 35 of which is connected by wire 82 to boiler limit regulator 76. The opposite side of the limit regulator is connected by wire 83 to the burner motor M, the circuit for which is completed by connection of supply line 80 to its other side. A branch 84 of supply line 80 extends to the outdoor timer where it connects to time motor 9, the other side of which connects to the back contact 36 of burner motor switch 34 to complete the time motor circuit. Branch wire 84 also connects to solenoid 22, the other side of which connects by wire 85 with impulse regulator 75. The circuit through impulse regulator is completed through connection of its other side to a branch 86 of supply line 79.

The operation of this system is as follows: At the end of a heating impulse, signified by rise of radiator temperature, regulator 75 will close, energizing solenoid 22 which in turn resets the cam actuator 33 for switch 34 and permits switch 34 to return to normal position, as shown, thus stopping the burner 17 and energizing the time motor 9. The cam 33 resets to a point determined by the engagement of a step of reset cam 32 with blade 62, the position of the blade and therefore the amount of reset being determined by outdoor temperature. However, cam 33 does not begin to advance until radiator temperature falls, opening impulse regulator 75, deenergizing solenoid 22 and connecting the cam shaft 20 with the time motor 9. The thermally adjusted delay period then commences, terminating when cam 33 trips switch 34, starting the burner and stopping the time motor. Burner switch 34 is retained in this operating position by cam 33 which cannot reset until its engagement with the time gear-train, now inoperative, is released. Release occurs only after the effect of burner operation causes the radiator to heat, closing impulse regulator 75 and energizing solenoid 22 which retracts gear 24 and allows cam shaft 20 to be returned by spring 30 to a new thermally adjusted reset position at the same time releasing switch 34 to reset to the position shown.

Turning now to the second embodiment of my invention, shown diagrammatically in Figure 3 and schematically in Figure 2. The outdoor timer mechanism now draws its operating current from transformer 87, necessitating complete divorce of outdoor timer circuits from the line voltage burner motor circuit. Timer control switch 68 provided for this purpose also is utilized as a high temperature cutout switch to suspend burner operation whenever outdoor temperature exceeds 65° F., and heater 72 and thermostat 73 are included to insure operation of the mechanism under greatly depressed temperature conditions.

This system is supplied by power lines 90 and 91 from any suitable source, presumably the domestic service. Line 90 connects with one side of boiler limit regulator 76 the other side of which connects by wire 92 to contact 35 of burner control switch 34 in the outdoor timer. Blade 37 of switch 34 connects by wire 93 to burner motor M whose other side connects to power line 91. Connected to wires 90 and 91 by wires 94 and 95 is the primary of transformer 87 schematically shown in power box 96 (see Figure 3) which also serves as a junction box for connection of the various elements of the system and houses, in addition, switch 97 connected across wires 92 and 93 in parallel with switch 34. This switch, though not essential, provides a convenient means of manually turning on the heating system for continuous operation independent of the outdoor timer but not of limit regulator 76.

The secondary of transformer 87 supplies reduced voltage for the operation of time motor, reset solenoid and heater in the outdoor timer. Wire 98 (see Figure 2) connects from the secondary by branch wire 98A to one side of solenoid 22, thence by wire 99 to impulse regulator 75 thence by branch 100 of wire 101 back to the other side of the secondary, placing solenoid 22 under sole control of regulator 75. A branch 102 of wire 98 connects to time motor 9 whose other side is connected by wire 103 to one contact of switch 68 whose other contact completes the circuit through branch 104 of wire 101. Time motor 9 is therefore controlled only by switch 68 which is doubly actuated by the time motor through the medium of arm 71 and by elevated outdoor temperature through engagement with blade 62 as previously described. Another branch 105 of wire 98 connects with main housing thermostat 73 adapted to close a circuit through wire 106 to heater 72 and thence to another branch 107 of wire 101 under depressed temperature conditions within the main housing, this circuit being entirely auxiliary to other elements of the outdoor timer and intended to be utilized only when deemed necessary.

Operating program of the second embodiment as shown in Figure 3 is essentially the same as that of the simplified form previously described. The timer interval is similarly determined upon reset by the position of blade 62. Burner switch 34 is closed by cam 33 after lapse of the timer interval following deenergization of solenoid 22 by regulator 75. In this embodiment however time motor 9 continues in motion for a slight additional period after switch 34 is tripped until arm 71 engages and opens switch 68. When effect of burner operation causes closure of contacts in impulse regulator 75 the resultant energization of solenoid 22 separates cam shaft 20 and related parts from mesh with the stationary time gear-train and allows return spring 30 to reset shaft 20 stopping the burner motor by virtue of the opening of switch 34 and starting the time gear-train, now uncoupled from cam shaft 20, as switch 68 closes under influence of its bias. Should temperature at element 46 exceed 65° F. blade 62 will engage and open switch 68 stopping time motor until subsequent decrease in outdoor temperature warrants further operation of the heating system. Should burner M be in operation at this moment the operation will continue until regulator 75 closes the solenoid circuit and resets the mechanism but switch 68 will be prevented from reclosing by blade 62 and no new timed cycle will be initiated so long as temperature remains above 65° F. even though cooling of radiator R will shortly deenergize solenoid 22 and couple the gear-train to cam shaft 20. Thermostat 73 is set to close at a desired low temperature, say 30° F., whereupon, by virtue of its control of heater 72, it will maintain the temperature within main housing at about that value to prevent extremely cold temperature without the main housing from interfering with the functioning of the mechanisms.

While I have shown a particular form of embodiment of my invention I am aware that many minor changes therein will readily suggest themselves to others skilled in the art without departing from the spirit and scope of the invention. Having thus described the invention, what I claim as new and desire to protect by Letters Patent is:

1. In a temperature control system, a switch, a switch actuator normally biased to a rest position, a time train adapted to drive said actuator, controllable coupling means between said actuator and said time train whereby said actuator may be released to rest position, variable positionable stop means for said actuator adapted to determine the time interval of said actuator, and means responsive to outdoor temperature conditions and associated with and adapted to position said stop means whereby said time interval may be automatically varied in accordance with variations in said condition.

2. In a temperature control system for a heating system having heat supplying means, the combination of a time drive, a time actuated switch controlling said heat supplying means, an actuator for said switch normally biased to a rest position and adapted to be coupled to said time drive, means responsive to a condition of said heating system for selectively coupling and uncoupling said actuator and said time drive, and thermal responsive stop means variably determining said rest position in predetermined relation to external atmospheric conditions.

3. In a temperature control system for a heating system having heat supplying means, the combination of a time drive, a time actuated switch controlling said heat supplying means, an actuator for said switch normally biased to a rest position and adapted to be controllably coupled to said time drive, and means responsive to a condition of said heating system for selectively coupling and uncoupling said actuator and said time drive, thermal responsive means adapted to vary the time relationship between said rest position and the switch operating position of said actuator with change in outdoor temperature, and additional switching means actuated by said thermal responsive means and in circuit with and adapted to suspend operation of said time drive upon increase of outdoor temperature above a predetermined degree.

4. In a temperature control system including a heating system and a heat supplying means, the combination of a controllable time drive, a switch adapted alternately to control the heat supplying means and the time drive and biased to time-drive operation position, an actuator for said switch adapted to be driven by said time drive, controllable coupling means for selectively coupling said actuator and said time drive, means responsive to atmospheric conditions and including a movable stop associated with said actuator whereby the time required for said actuator to move said switch to operate said heat supplying means may automatically be varied, and means responsive to a condition of the heat supplying means for controlling said coupling means in a manner that said actuator will be coupled to said time drive so long as said condition of the heating plant is below a desired level.

5. In a temperature control system, a switch, a switch actuator normally biased to a rest position, a time train adapted to drive said actuator, means for selectively coupling the time train with the actuator and adjustable means for varying said rest position including stop means determining said rest position for varying the time interval of said timer, a member responsive to a condition and adapted to adjust said stop means, and means for coupling the stop means with said member comprising cooperating levers adapted to be aligned at a predetermined value of said condition and lever adjusting means for varying the relative lengths of said levers whereby the degree of influence of said member on said stop means may be varied without affecting the interval of said timer at said predetermined value of the condition.

6. In a control system employing a control timer including a time actuated burner switch, and means for resetting said timer, the combination of interval adjusting means for said timer comprising a movable stop for the switch actuator, a member responsive to a condition and adapted to move said stop and coupling means coupling said member and said stop comprising mechanical linkage and linkage adjusting means adapted to alter the lever advantage of said linkage, the members of said linkage being disposed always in alignment at a predetermined value of said condition regardless of the linkage adjustment, whereby the degree of influence of said member on said stop may be altered without affecting the interval of said timer at said predetermined value of the condition.

7. In a burner control system including a burner for heating a space, a temperature responsive member external to said space and a timer controlling said burner, said timer including an interval adjusting member, the combination of adjustable coupling means coupling said first member and said second member whereby the degree of movement of said second member upon a given movement of said first member may be varied, said coupling means including cooperating levers and means for varying the ratio of said levers, said levers being disposed always to return said second member to a selected position when said first member is influenced by a predetermined value of external temperature whereby burner intervals will be the same at said value for every adjustment of said coupling means.

8. In a temperature control system for a heating system having heat supplying means, the combination of a time drive, a time actuated switch controlling said heat supplying means, an actuator for said switch normally biased to a rest position and adaped to be controllably coupled to said time drive, means responsive to a condition of said heating system for selectively coupling and uncoupling said actuator and said time drive, and thermal responsive means adapted to vary the time relationship between said rest position and the switch operating position of said actuator, said last means including a variable stop determining the rest position of said actuator and a thermal responsive element associated with and adapted to position said stop.

9. A temperature control system comprising in combination a heating system, a heat supplying means, a switch controlling said heat supplying means, a timer normally biased to a rest position and adapted to actuate said switch at the close of a timed interval, thermal responsive means adapted to vary said time interval under the influence of outdoor atmospheric conditions, controllable means for releasing said timer whereby it may be reset and rendered selectively effective or ineffective, and means responsive to a condition of the heating system for controlling said release means, said thermal responsive means including a variable stop determining the rest position of said timer and a thermal responsive element associated with and adapted to position said stop.

CHARLES C. CRAM.